United States Patent
Twichell et al.

(10) Patent No.: US 11,258,514 B2
(45) Date of Patent: Feb. 22, 2022

(54) ALIGNING SINGLE-APERTURE OPTICAL TRANSCEIVER AND METHOD

(71) Applicant: BLUE CUBED, LLC, Niwot, CO (US)

(72) Inventors: Jonathan C. Twichell, Acton, MA (US); Ryan W. Kingsbury, Wheat Ridge, CO (US); Scott E. Palo, Niwot, CO (US)

(73) Assignee: BLUE CUBED, LLC, Niwot, CO (US)

( * ) Notice: Subject to any disclaimer, the term of this patent is extended or adjusted under 35 U.S.C. 154(b) by 0 days.

(21) Appl. No.: 17/371,919

(22) Filed: Jul. 9, 2021

(65) Prior Publication Data

US 2022/0014274 A1    Jan. 13, 2022

Related U.S. Application Data

(60) Provisional application No. 63/050,467, filed on Jul. 10, 2020.

(51) Int. Cl.
*H04B 10/40* (2013.01)
*G02B 27/28* (2006.01)
(Continued)

(52) U.S. Cl.
CPC ............ *H04B 10/40* (2013.01); *G02B 5/122* (2013.01); *G02B 5/3083* (2013.01);
(Continued)

(58) Field of Classification Search
CPC .... H04B 10/40; H04B 10/2589; H04B 10/11; G02B 5/122; G02B 5/3083; G02B 27/141; G02B 27/283
See application file for complete search history.

(56) References Cited

U.S. PATENT DOCUMENTS 3,942,894 A    3/1976    Maier
4,939,369 A *  7/1990    Elabd ................. G01S 7/486
                                                    250/330
(Continued)

FOREIGN PATENT DOCUMENTS

GB    2218874 A    11/1989

OTHER PUBLICATIONS

Reference number list for U.S. Appl. No. 17/371,919 of Twichell et al. (Twichell, the present application) (Year: 2021).*
(Continued)

*Primary Examiner* — Andrew Jordan
(74) *Attorney, Agent, or Firm* — Lathrop GPM LLP

(57) ABSTRACT

A method for aligning a first optical transceiver includes steps of splitting, directing, recording, and actuating. The splitting step includes splitting a light beam into a) a reference beam that propagates along a common optical path within the first optical transceiver and b) a transmit beam that that propagates away from the first optical transceiver and toward a second optical transceiver. The directing step includes directing, with a beam director, a receive beam from the second optical transceiver onto the common optical path. The recording step includes recording, with a tracking focal-plane array (FPA) that intersects the common optical path, a reference-position of the reference beam and an initial-received-position of the receive beam on the tracking FPA. The actuating step includes actuating the beam director based upon the initial-received-position to achieve a subsequent position of the receive beam on the tracking FPA.

20 Claims, 12 Drawing Sheets

(51) Int. Cl.
  *G02B 27/14* (2006.01)
  *G02B 5/122* (2006.01)
  *H04B 10/25* (2013.01)
  *G02B 5/30* (2006.01)
  *H04B 10/11* (2013.01)
(52) U.S. Cl.
  CPC ......... *G02B 27/141* (2013.01); *G02B 27/283* (2013.01); *H04B 10/2589* (2020.05); *H04B 10/11* (2013.01)

(56) References Cited

U.S. PATENT DOCUMENTS

| | | | |
|---|---|---|---|
| 9,587,804 B2* | 3/2017 | Chen | A63F 13/213 |
| 9,853,740 B1 | 12/2017 | Bortz | |
| 10,215,833 B1* | 2/2019 | Hutchin | G01J 9/0215 |
| 10,527,729 B2* | 1/2020 | Crouch | G03H 1/0005 |
| 10,892,824 B2* | 1/2021 | Geisler | H04B 10/1127 |
| 2004/0258415 A1* | 12/2004 | Boone | H04B 10/1125 |
| | | | 398/125 |
| 2009/0142066 A1 | 6/2009 | Leclair et al. | |
| 2010/0158536 A1 | 6/2010 | Valillon et al. | |
| 2013/0293722 A1* | 11/2013 | Chen | F21V 5/02 |
| | | | 348/164 |
| 2016/0043800 A1 | 2/2016 | Kingsbury et al. | |
| 2019/0081703 A1 | 3/2019 | Miller | |
| 2019/0242999 A1* | 8/2019 | Crouch | G03H 1/0005 |

OTHER PUBLICATIONS

PCT Application No. PCT/US2021/041126, International Search Report and Written Opinion, dated Nov. 8, 2021, 20 pages.

\* cited by examiner

ALIGNING SINGLE-APERTURE OPTICAL TRANSCEIVER AND METHOD

CROSS-REFERENCE TO RELATED APPLICATIONS

This application benefits from and claims priority to U.S. provisional patent application Ser. No. 63/050,467, filed on Jul. 10, 2020, the disclosure of which is incorporated herein by reference in its entirety.

BACKGROUND

Embodiments disclosed herein relate to free-space optical communication terminals. More particularly, the embodiments relate to the optical design, and methods of relaxing the mechanical tolerances and simplifying production of free-space optical links.

Free-space optical communication uses a beam of light to transport data (either analog or digital) from a transmitter terminal to a receiving terminal. Often a bidirectional pair of links is desirable. Such links are particularly effective in space and airborne systems communicating between platforms or between the platform and ground. Compared to RF signals, optical signals have very short wavelengths meaning the required aperture is considerably smaller than similar speed RF terminals.

Many optical terminals require precision pointing to the opposite terminal, and very high precision in fabricating the optics and the mechanical systems that hold the terminal. To achieve optimal performance, diffraction-limited optical beams are desirable. Additionally, the optical system in these terminals must be able to efficiently couple photons from free-space into (and conversely out of) small area devices such as single mode fibers, high bandwidth optical detectors, and small output facet lasers.

Applications

Free-space optical systems can be used in a wide variety of applications. Bidirectional free-space optical links can offer power-efficient communication between spacecraft, between spacecraft and ground stations, between spacecraft and aircraft and also between underwater vehicle and/or terminals. In bidirectional links, the partner terminal's optical signal, either the main communication signal, or a parallel beacon signal, is often used establish pointing. For some situations, an additional "point ahead" correction must be applied to compensate for relative movement and flight time of the signals.

Unidirectional links can be used in the same scenarios describe above but are often aided by a return direction unmodulated or slowly modulated optical beacon signal. This return signal is used to establish and maintain alignment.

The core objective of any free-space optical communication system is to point the outgoing beam at the partner receiver. The partner's transmit beam, or beacon signal, informs the terminal precisely where the partner is located. In almost all free space optical communication applications, this pointing arrangement is highly dynamic and control systems must be used to maintain pointing over time. Pointing adjustments arise not only from relative movement of terminals, but also from local jitter imparted by platform vibration, thermal warpage, and many other factors. Many space-to-space applications require 1 microradian pointing precision with control loop bandwidths extending to several hundred hertz.

In principle, if you know your terminal's attitude relative to the stars to extreme precision, your terminal's location to within meters, and the position of your communication partner's terminal to within meters, one could blindly point in the right direction. Practically, this is all but impossible. The platform vibrates, creeps with temperature changes and sun angle, and shifts during launch and maneuvers. The resulting knowledge of the optical system pointing is quite poor, even if the star orientation system is exquisite.

SUMMARY OF THE EMBODIMENTS

Embodiments of single-aperture optical transceivers disclosed herein use the receive beam or beacon to provide a precise pointing reference. By keeping a common optical path to a fully differential tracker. The tracker precisely measures the difference in angle between the transmit and receive beams. In embodiments, the system maintains sub-microradian pointing with better than 1-microradian precision in 500 Hz of bandwidth.

In a first aspect a method for aligning a first optical transceiver includes steps of splitting, directing, recording, and actuating. The splitting step includes splitting a light beam into a) a reference beam that propagates along a common optical path within the first optical transceiver and b) a transmit beam that that propagates away from the first optical transceiver and toward a second optical transceiver. The directing step includes directing, with a beam director, a receive beam from the second optical transceiver onto the common optical path. The recording step includes recording, with a tracking focal-plane array (FPA) that intersects the common optical path, a reference-position of the reference beam and an initial-received-position of the receive beam on the tracking FPA. The actuating step includes actuating the beam director based upon the initial-received-position to achieve a subsequent position of the receive beam on the tracking FPA.

In a second aspect, a single-aperture optical transceiver includes a tracking focal-plane array (FPA), a beam splitter, and a retroreflector. The beam splitter that includes a first port, a second port, a third port opposite the first port, a fourth port opposite the second port, and a beam-splitting interface. The beam splitter and the tracking FPA define a common optical path for a receive beam and a reference beam that are respectively received and generated by the single-aperture optical transceiver. The retroreflector that retroreflects the reference beam exiting the third port back to the third port. The beam splitter splits a light beam incident on the first port into a transmit beam and the reference beam. The tracking FPA receives both the reference beam and the receive beam via the common optical path.

DETAILED DESCRIPTION OF THE EMBODIMENTS

Figure 1:
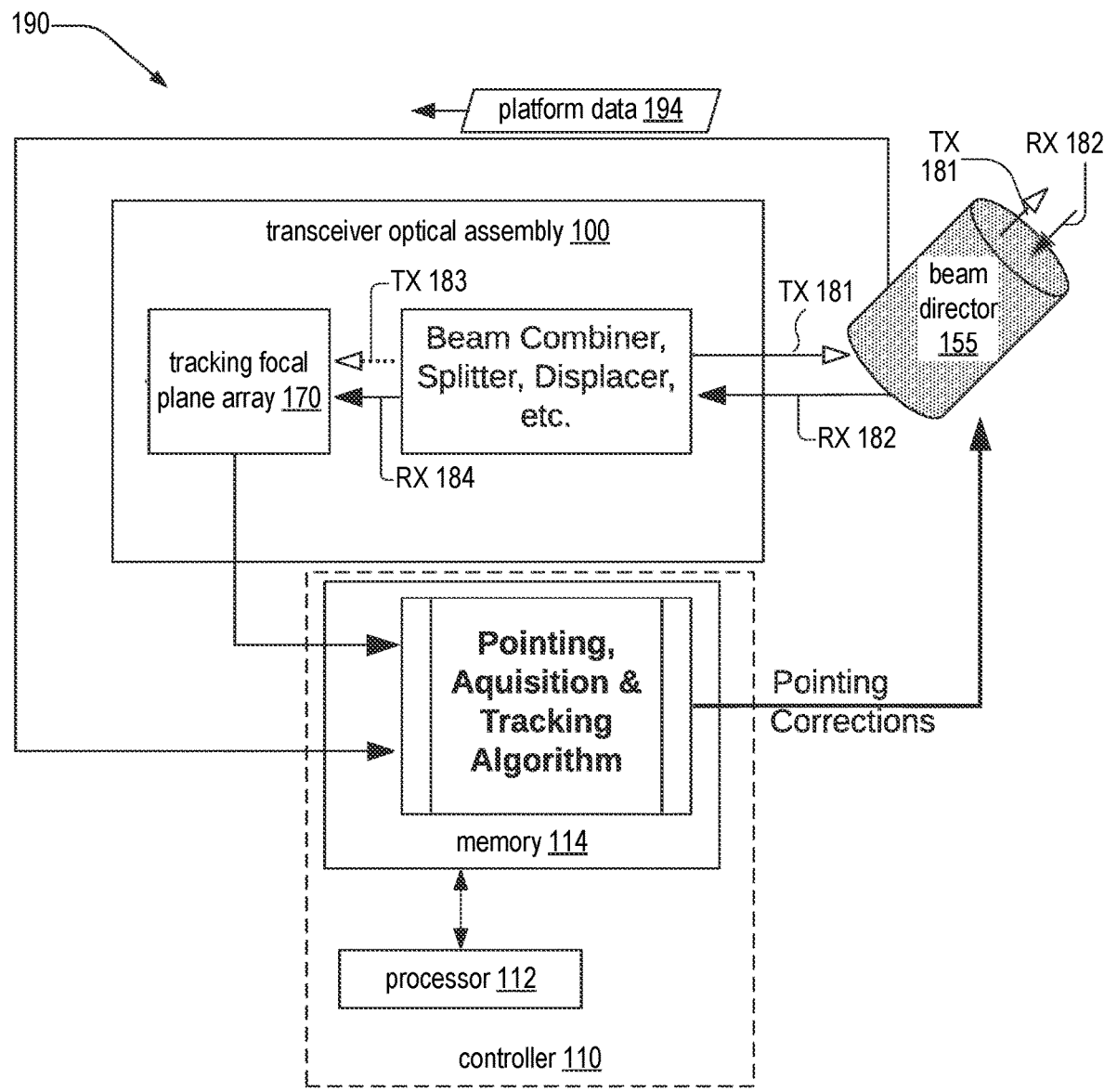
FIG. 1 is a schematic of a single-aperture optical transceiver that includes an optical assembly, in an embodiment.

FIG. 1 is a schematic of a single-aperture optical transceiver 190, which includes a transceiver optical assembly 100 and a beam director 155. Herein, single-aperture optical transceiver 190 is also referred to as transceiver 190. Transceiver optical assembly 100 provides a collimated interface to beam director 155 for both a transmitted beam 181 and a receive beam 182. Herein, TX and RX refer to transmitted beams and received beams respectively, examples of which include beams 181 and 182 respectively. Beam director 155 may include a gimbal. In embodiments, transceiver optical assembly 100 includes beam director 155.

Transceiver optical assembly 100 may also provide angle estimates for both transmitted beam 181 and receive beam 182 by way of a tracking focal plane (FPA) 170, hereinafter tracking FPA 170. Tracking FPA 170 receives transmitted beam 183 and receive beam 184, which are parts of transmitted beam 181 and receive beam 182 respectively. These estimates are provided to a pointing, acquisition and tracking algorithm which generates correction commands for the beam director.

In embodiments, optical transceiver 190 includes a controller 110, which includes a processor 112 and a memory 114. Memory 114 stores machine readable instructions, e.g., a pointing acquisition and tracking algorithm, that when executed by processor 112, control processor 112 to change a pointing direction of beam director 155.

1.1 Principle of Operation

A technical benefit of transceiver optical assembly 100's design is its robustness to implementation imperfections. These imperfections can arise from mechanical tolerances, thermal stresses, launch loads, etc. The imperfections can be broadly divided into two categories: those which compromise beam quality (e.g., imprecise focus leading to reduced transmit irradiance) and those which alter beam pointing (e.g., a tip/tilt bias affecting either the transmit or receiver beam). Aspects of transceiver optical assembly 100 address both categories of imperfections; however, the design's largest advantage over other approaches is its ability to maintain pointing performance.

1.1.1 Common Optical Path

Figure 2:
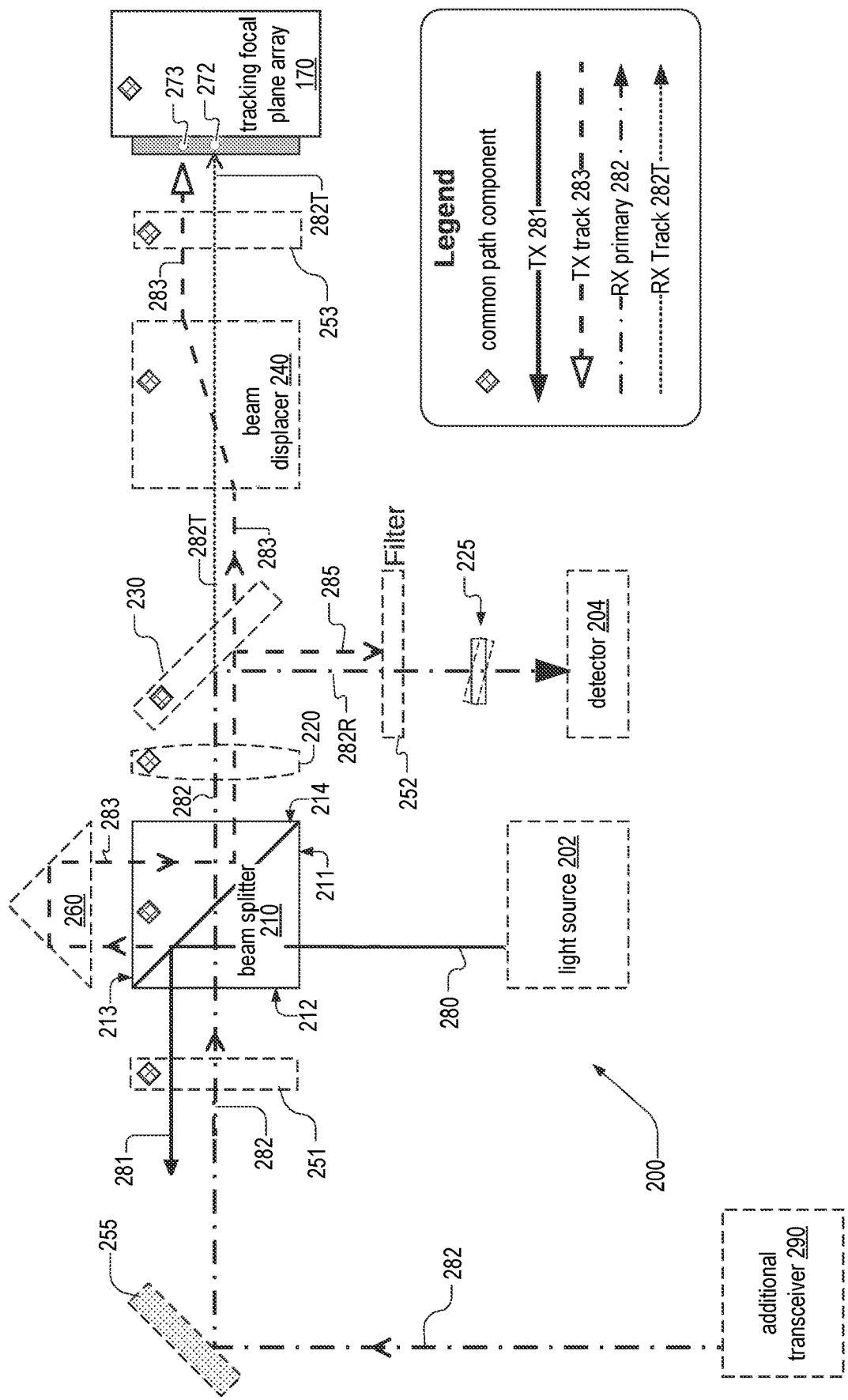
FIG. 2 is a schematic of a transceiver optical assembly, which is an example of the optical assembly of FIG. 1.

In embodiments, a primary tenet of the design is to maximize length of a common optical path, relative to non-common (shared) optical paths, for the outgoing (TX) and incoming (RX) optical signals propagating from and to transceiver 190. Imperfections in components along this common optical path affect both signals equally. FIG. 2 is a schematic of a transceiver optical assembly 200, and is an example of transceiver optical assembly 100. FIG. 2 is not comprehensive of components used to realize a real system (e.g., stops for stray light, multi-element collimation systems, polarization components, etc.) but is rather intended to convey operation at a high level.

In FIG. 2, components marked with a diamond are common-optical-path components that carry both incoming and outgoing signals along the common optical path. In the example of FIG. 2, the common optical path traverses beam splitter 210 and ends at tracking FPA 170.

Transceiver optical assembly 200 includes a beam splitter 210 and tracking FPA 170. In embodiments, transceiver optical assembly 200 also includes at least one of a lens 220, a beam sampler 230, a beam displacer 240, a retroreflector 260, a light source 202, and a photodetector 204. Transceiver optical assembly 200 may also include at least one of optical filters 251-253. When optical assembly 200 includes each of the following components, the included component intersects the common optical path such that the common optical path traverses the component: filter 251, lens 220, beam sampler 230, beam displacer 240, and filter 253.

In embodiments, at least part of the common optical path is within an optical fiber, or multiple optical fibers of transceiver optical assembly 200. The multiple optical fibers may be coupled together. (coupled together. In such embodiments at least one of filter 251, beam splitter 210, lens 220, beam sampler 230, beam displacer 240, and filter 253 is an inline optical fiber component optically coupled to the one or more optical fibers of the common optical path.

Light source 202 generates a light beam 280, which beam splitter splits into a transmitted beam 281 and a reference beam 283. Reference beam 283 is transmitted by beam splitter 210, retroreflected by retroreflector 260 back to beam splitter 210, which reflects reference beam 283 to tracking FPA 170. Beams 281-283 are respective examples of beam 181-183. Retroreflector 260 may be a corner cube retroreflector.

In embodiments, light beam 280 has a spectral range that is in one or more of the following regions of the electromagnetic spectrum: x-ray, ultraviolet, visible, near-IR, mid-IR, and far-IR.

Transceiver optical assembly 200 receives a receive beam 282 at port 212 of beam splitter 210. Receive beam 282 is, for example, an instance transmitted beam 281 transmitted by an additional transceiver 290 toward optical assembly 200. FIG. 2 denotes a tracked receive beam 282, which is at least part of receive beam 282 incident on tracking FPA 170. Additional transceiver 290 is an example of transceiver 190. In embodiments, optical assembly 200 includes a beam director 255 that directs receive beam 282 toward port 212. Beam director 255 is an example of beam director 155.

Filter 251, beam splitter 210, lens 220, beam sampler 230, beam displacer 240, filter 253, and tracking FPA 170 are all common-optical-path components (marked with diamonds). Imperfections in these components largely affect both transmitted beam 281 and receive beam 282 in an identical manner. For example, if lens 220 for tracking FPA 170 is inadvertently tilted, both reference beam 283 and tracked receive-beam 282T are translated an equal amount on tracking FPA 170. Non-common-optical-path components are used sparingly in the system and only in situations where tolerances can be well-controlled or where tolerances are loose. "Tolerance" is being used loosely here to refer to both tip/tilt imperfection as well as positioning imperfections (e.g., centering on beam or focal length) and other assembly or mounting errors.

The various filters in the design are either wavelength or polarization sensitive devices depending on the orthogonality/diversity scheme that is used (see 1.1.3). The function of filter 251, which may include a plurality of filters, serves to reduce stray light into the system but efficiently passes both transmitted beam 281 and receive beam 282. Filter 252 prevents sampled TX light from reaching photodetector 204, thereby reducing background noise. Filter 253, another common-optical-path component, is optional in the system but can be helpful for balancing the irradiance of the tracking TX and RX beams on tracking FPA 170. This can help relax the dynamic range requirements of tracking FPA 170. Filter 253 may also be placed between beam splitter 210 and retroreflector 260.

1.1.2 Common Tracking Sensor

A second tenet of the design is to use a common tracking FPA 170 for sensing the angle of reference beam 283 and tracked receive-beam 282T via positions of a reference spot 273 and a RX spot 272 respectively on tracking FPA 170. In embodiments, along the common optical path of transceiver 200, a distance between lens 220 and tracking FPA 170 differs from a focal length of lens 220 by less than a depth of focus of lens 220. As such, lens 220 forms reference spot 273 and RX spot 273 on tracking FPA 170, thereby converting propagating angles of beams 283 and 282 to positions on tracking FPA 170.

Beam displacer 240 applies a tightly controlled displacement to one or both of the signals so that the beams converge onto independent spots 273 and 272 on tracking FPA 170. This may seem counterintuitive given the first design tenet of maximizing the common optical path; however, components that perform this function are monolithic and extremely stable over temperature and other factors (e.g., angle, wavelength, etc.). Beam displacer 240 is used so reference beam 283 and tracked receive-beam 282T may both be tracked by tracking FPA 170 without overlapping. Alternate approaches, e.g., when optical assembly 200 does not include beam displacer 240, would be to use the point-ahead angle of the system, chromatic dispersion in a wavelength division multiplexed system, or timing in a time division multiplexed system.

The tracking approach of optical assembly 200 differs from many traditional free space optical systems which use quadrant or position sensitive diode (PSDs) detectors to measure the position/angle of an optical signal. Quad-cells and PSDs also have a relatively narrow field of view, which puts them at a disadvantage relative to tracking FPAs, such as tracking FPA 170. Notably, they can only be used to track a single optical signal. With this limitation, many designs will include separate RX and TX tracking sensors which must then be aligned to one another. PSDs also provide a limited range/resolution ratio of approximately 1000:1, tracking FPA 170 and centroiding algorithm can perform at 10,000:1 or greater.

1.1.3 TX/RX Orthogonality

To transmit and receive at the same time, the two beams (mostly) travel down the same optical path and must not interfere with each other. The general quality we are describing is orthogonality of the transmit and receive beams. Orthogonality is necessary to separate the transmit and receive beams in the system and can be accomplished in a variety of ways. In general, transmit beam power is enormous compared to the receive beam power. As a consequence, the orthogonality scheme must provide high selectivity. Any cross-talk between the paths can easily swamp the receive detector with transmit beam.

Spatial diversity (e.g., separate apertures) is one way to accomplish this orthogonality, but it requires precision alignment of the two apertures. For a single aperture designs (which relieve alignment issues) one must use other orthogonal characteristics of the optical beams. These might include wavelength, polarization, angular orbital momentum, or time interleaving. Angular isolation is in principle possible, but given the long ranges and limited apertures, this is impractical for most systems.

1.2 Key Optical Components

This section describes of key optical components of embodiments of core optical assembly 100. Their role in the system as well as suitable commercial options for each of them are given.

1.2.1 Collimated Transmit Source

Transceiver optical assembly 100 accepts a collimated transmit beam from an optical source such as a laser. A bare laser diode could be used in conjunction with suitable collimation optics. Alternatively, a fiber coupled laser could be connected into the design by way of a fiber collimator. The exact approach is not critical so long as the beam is well collimated.

The transmit source may also incorporate additional filtering to improve the purity of the signal in the chosen diversity scheme. For a wavelength diversity system, this could be accomplished with wavelength selective filters. For a polarization diversity system, polarizers could be used to attenuate cross-polarized signal.

1.2.2 Beam splitter & Corner Cube Retroreflector

Beam sampler 230 may be a polarizing or dichroic beam splitter. Beam sampler 230 and retroreflector 260 combine the TX and RX signals into a common collimated beam space. A small fraction of the TX signal power is sampled and retroreflected onto the RX signal path, which is critical for the self-referenced optics approach. Both the sampled TX signal and the RX signal overlap in position and angular space when exiting beam splitter 210 but are orthogonal (e.g., in polarization or in wavelength).

In embodiments, beam splitter 210 is a polarizing beam splitter or dichroic beam splitter. When beam splitter 210 is a polarizing beam splitter, retroreflector 260 may be polarization preserving (e.g., metalized coating, or "cat's eye" retro). Retroreflector 260 is not on the common RX/TX optical path.

For some applications, optical assembly includes, along an optical path other than the common-optical path, an active steering mechanism 225 can change the relative alignment between reference beam 283 and receive beam 282. Examples of steering mechanism 225 include fine steering mirrors, electro-optic nutators, a wedge prism, and Risley prisms. Steering mechanism 225 may be used to align receive beam 282 with photodetectors 204, or to an optical fiber coupled to photodetector 204. Self-calibration or post-factor calibration of system alignment is possible with this added mechanism.

Figure 3:
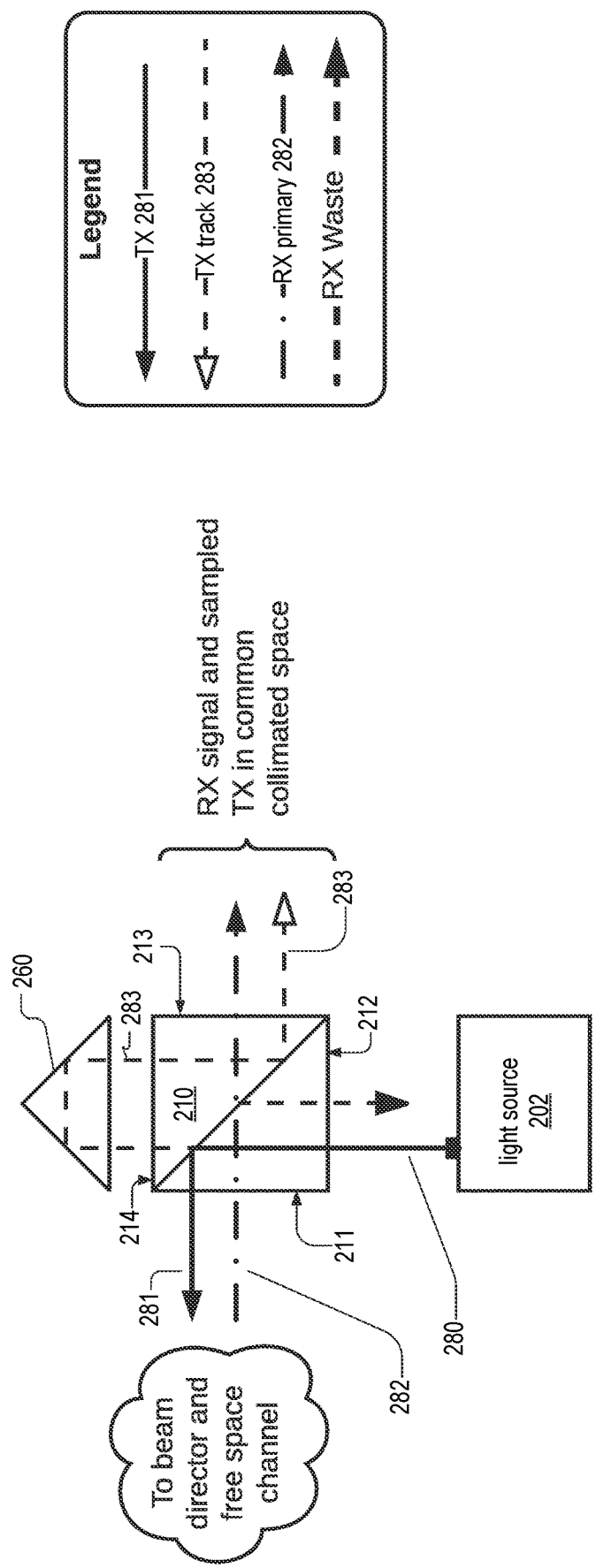
FIG. 3 is a schematic of a beam splitter, retroreflector, and light source of the optical assembly of FIG. 2.

FIG. 3 is a schematic of beam splitter 210, retroreflector 260, and light source 202. Beam splitter 210 has ports 211, 212, 213, and 214, which may be respective planar surfaces of beam splitter 210 when beam splitter 210 is a beam splitter cube. Beam splitter 210 combines reference beam 283 and receive beam 282 into a common collimated space at port 212. Receive beam 282 passes through beam splitter 210 (port 212 to 214) undisturbed except for an insignificant amount of signal that is lost from port 211. Light beam 280 enters at port 211 and small portion is sampled, as reference beam 283, via port 213 where it is reversed in direction and joins receive beam 282 exiting at port 214.

1.2.3 Beam Splitter

Beam sampler 230 divides incoming optical power between the high bandwidth communications detector and tracking FPA 170. When optical assembly 200 includes beam sampler 230, beam sampler 230 reflects part of receive beam 282 as a receive beam 282R, and transmits part of receive beam 282 as a tracked receive-beam 282T. In embodiments, tracked receive-beam 282T co-propagates with sampled Reference beam 283. In embodiments, the optical intensity of beam 282R exceeds that of 282T, e.g., by a factor of between ten and ninety-nine.

1.2.4 Communications Detector

Photodetector 204 converts the optically modulated receive beam 282 back in to an electrical signal for electronic demodulation. Photodetector 204 may include at least one of a photodiode, avalanche photodiode, silicon photomultiplier, or other similar device. Silicon photomultiplier detectors tend to have relatively large sensitive areas (100 µm diameter or more, and hence a relatively large field of view) so mechanical positioning is not a challenge relative to lens 220 (FIG. 2). In embodiments, photodetector 204 is located such that it receives uniform illumination (e.g., out of focus or in a deliberately altered beam such as collimated or simply aberrated).

In the simplified optics diagram (FIG. 2) some of sampled reference beam 283 is also diverted toward photodetector 204 as a noise beam 285. With the exception of some built-in-self-test use cases, noise beam 285 is unwanted as it contributes background noise in the detection of RX beam 282R. For this reason, additional filtering may be implemented here to attenuate noise beam 285, e.g., by filter 252. The approach would depend on the diversity scheme (e.g., polarization, wavelength, etc.) used in the system. For example, filter 252 may be either a polarizer or a spectral filter.

1.2.5 Beam Displacer

Beam displacer 240 imparts a fixed spatial displacement to one or both of the signals so that they arrive at different positions on tracking FPA 170. This ensures that the signals can be sensed independently. In embodiments, beam displacer 240 is one of a ytterbium orthovanadate beam displacers and Wollaston prism. These components are extremely stable over temperature and have very modest alignment requirements.

Without this component, both Reference beam 283 and RX beam 282 would overlap and fall on the same pixel(s) of tracking FPA 170. This situation would complicate simultaneous differential tracking of both signals, hence the need for beam displacer 240.

1.2.6 Tracking Focal Plane Array

Tracking FPA 170 is used to measure the far-field position (determined by the angle of arrival in the far field) of both Reference beam 283 and RX beam 282. In embodiments, the position of each signal is estimated with a centroiding algorithm (or similar), which can provide sub-pixel accuracy. This accuracy can achieve sub-microradian track accuracy in angular space of angular position estimates stored in memory 114.

The angular position estimates are used to correct system pointing with an external beam director, which forms a pointing control loop, which may be executed by controller 110. The pointing control loop executed controller 110 uses platform data 194 received from beam director 155. Data 194 includes at least one of platform attitude, platform position, and time.

Note as the beam director moves, RX spot 272 moves on the focal plane, but TX spot 273 remains fixed. The bandwidth of this control loop is limited by the frame rate of tracking FPA 170. For some applications, control bandwidths in excess of 100 Hz may be necessary which requires a tracking focal plane capable of frame rates exceeding a few hundred frames per second. Some focal planes can provide these frame rates using "region of interest" readout features.

Dynamic range is another important characteristic of tracking FPA 170 since it is being used to simultaneously image sampled reference beam 283 as well as tracked receive-beam 282T. The degree to which these signals must be matched in power/irradiance is dictated by the dynamic range of tracking FPA 170. Focal plane dynamic range arises from factors such as well-depth, ADC bit depth, and exposure control. An external polarization or wavelength selective filter may also be used to help "balance" the power of the two signals.

The exact choice of a tracking focal plane solution also depends on the wavelength of operation. The approach we describe can be generalized to any wavelength. For example, silicon detectors can be used for x-rays through the near infrared, InGaAs and quantum dot detectors can be used in the mid-infrared and InSb or HgCdTe can be used in the mid- and long-wave infrared.

Operation of the tracking focal plane may also employ other common calibration techniques such as dark frame subtraction and "flat fielding" to mitigate unwanted device characteristics.

1.2.6.1 Multi-Focal Plane Alternative

It is also possible to use two tracking focal planes instead of one. Since a separate focal plane is used for the transmit and receive beams, the dynamic range requirements can be relaxed and additional flexibility in frame rate selection is possible. A device similar to beam splitter 210 (Section 1.2.2) is needed to split the two signals, but beam displacer 240 is no longer necessary. Additional alignment requirements stem from the non-common beam paths leading to each of the focal planes.

1.3 Tracking and Acquisition Concept

In this section the acquisition and tracking process is described through example scenarios that are illustrated by the image "seen" by tracking FPA 170.

1.3.1 Scenario 1: Factory Alignment

Figure 4:
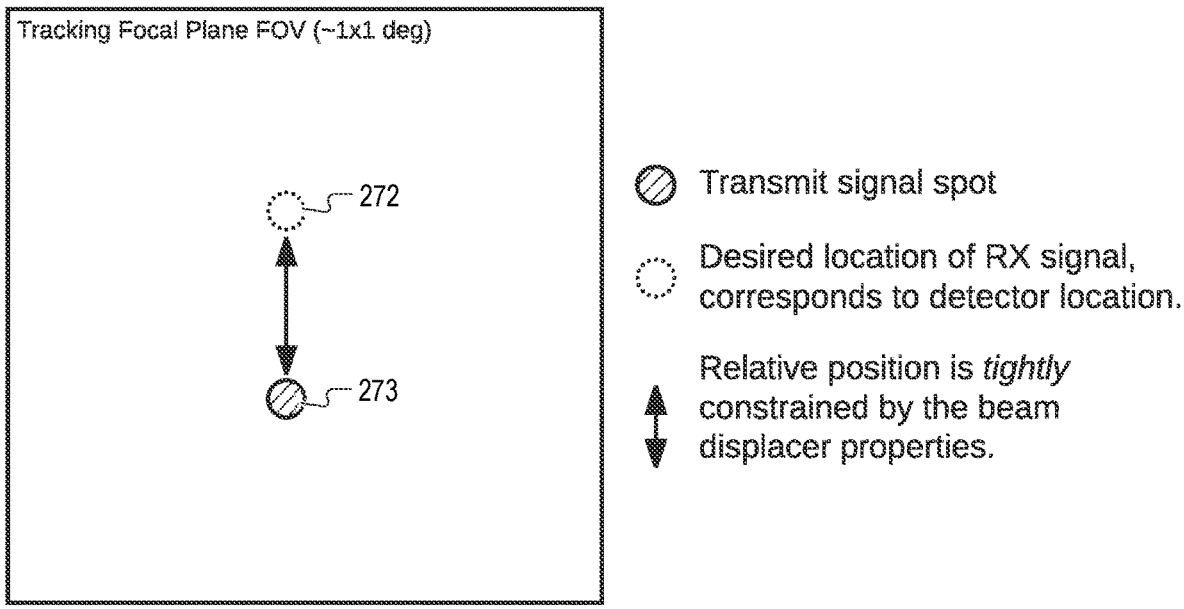
FIG. 4 illustrates a result of calibration of optical assembly of FIG. 1, in an embodiment.

FIG. 4 illustrates a result of calibration and/or alignment of optical assembly 200, which places both TX spot 273 and RX spot 272 (when aligned with photodetector 204) near the center of a field of view of tracking FPA 170. This calibration is considered a "coarse" adjustment as the field of view is relatively wide (order of 1×1 degree). Note that the separation between TX spot 273 and RX spot 272 is purely a result of the effects of beam displacer 240, and is very stable over mechanical/thermal loading.

In addition to coarse alignment, focus and power level adjustments may also be performed to establish the desired signal irradiance and spot size on the focal plane. A simulated receive beam (or externally reflected transmit beam) will be used to identify the position of RX spot 272 on FPA array 170.

Full frame readout of the focal plane, likely at a relatively low frame rate, may be used to support the above calibration.

1.3.2 Scenario 2: Before/after Environmental Stresses

Figure 5:
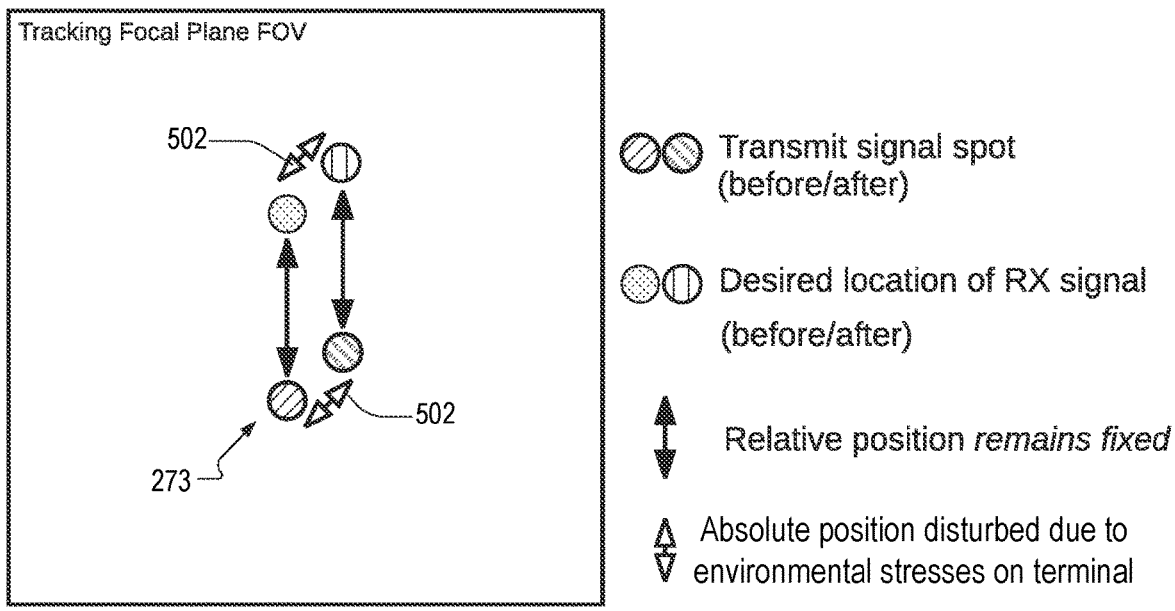
FIG. 5 illustrates mechanical and thermal loading of the optical assembly of FIG. 1, which results in translations of tracked transmitted and received spots, in an embodiment.

During launch and also between operating sessions, transceiver 190 will invariably be subjected to various mechanical and thermal stresses which will perturb the factory alignment. Due to design of optical assembly 200, the result is equal movement of both TX spot 273 and RX spot 272 on the focal plane, at FPA 170. FIG. 5 shows this perturbation as double-headed arrows 502. Crucially, their relative position remains fixed due to the properties of beam displacer 240.

Before each operating session, full frame images are collected with Reference beam 283 enabled in order to measure any drift (i.e., system alignment changes that arise due to mechanical and thermal loading). Note that receive beam 282T is not needed to perform this measurement; simply measuring the position of TX spot 273 centroid is sufficient.

In embodiments, this perturbation measurement is performed continuously during operation of transceiver 190 to compensate for thermal transients that arise from terminal duty cycling or solar loading.

1.3.3 Scenario 3: Coarse Acquisition

Figure 6:
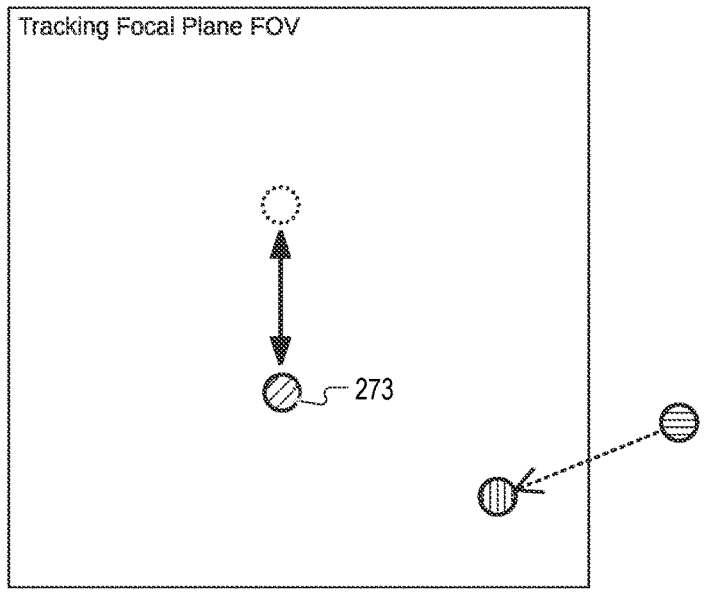
FIG. 6 schematically illustrates a coarse acquisition process for steering receive beam in a field of view of a tracking focal plane of the optical assembly of FIG. 1, in an embodiment.

In embodiments, the pointing, acquisition and tracking algorithm of controller 110 receives information from the host to assist with coarse acquisition. These priors can include the position and velocity of both terminals (transmit and receive), the attitude of the local platform, as well as the time of day. From these priors, the terminal can compute the relative look angle of the partner terminal and command beam director 155 accordingly. FIG. 6 illustrates this process.

Ideally, these priors are accurate enough to place the partner terminal within the field of view (FOV) of tracking FPA 170 (e.g., order of 1 degree) with high probability. When the solution is not accurate enough, then other well-known acquisition methodologies may be employed such as spiral scan or raster scan patterns. These alternate strategies require additional acquisition time, but enable the use of focal planes with smaller FOV.

One additional complexity is that of probability of detection, which depends on the quality of the priors, the path length, and the beam width. The communication beam from the partner spacecraft is typically very narrow (microradians) so the probability of detection is very low when the acquisition process begins. The simplest solution is for each terminal to employ a secondary acquisition beacon or intentional, configurable, defocus of the TX beam. This beacon laser has a much wider beam width than the communication beam and is only enabled during the acquisition process.

1.3.4 Scenario 4: Fine Pointing and Tracking

Figure 7:
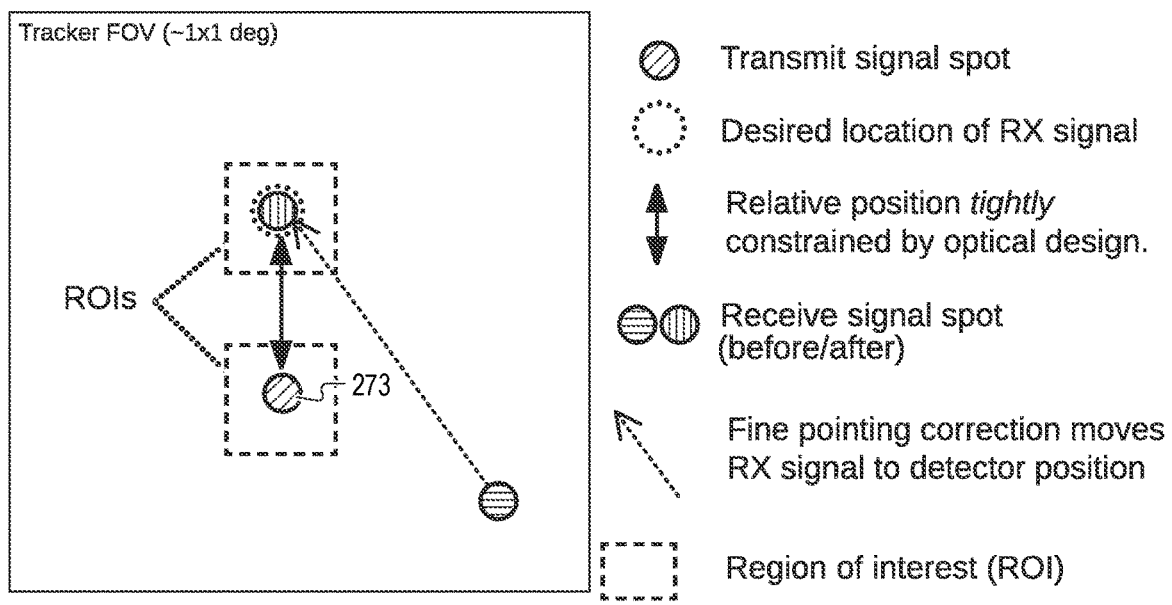
FIG. 7 illustrates the establishment of fine tracking when the RX signal is brought within the field of view of a communications detector of the optical assembly of FIG. 1, in an embodiment.

In a subsequent stage of acquisition, which may be a final stage, pointing is further improved to bring the RX signal within the field of view of photodetector 204, as shown in FIG. 7. Fine tracking is established when receive beam 282 is brought into the FOV of photodetector 204. The tracking focal plane also shifts to a region of interest (ROI) readout scheme, which increases frame rate and control loop bandwidth. Although the FIG. 7 shows two ROIs, the spots may be close enough to each other for a single ROI to be sufficient.

Note that the field of view of photodetector 204 is generally much smaller than that of the tracking focal plane. Additionally, the tracking bandwidth is also increased during the stage by switching from full frame readout of tracking FPA 170 to faster region of interest (ROI) based readout.

Once fine pointing is established, continuous tracking is needed to compensate for platform jitter and other system stresses (e.g., thermal transients). In all cases, the goal of the tracking algorithm is to maintain the relative position of the TX and RX centroids.

1.4 Handedness & Terminal Gender

In embodiments, transmitted beam 281 is orthogonal to receive beam 282 in at least one of polarization and wavelength. As an example, assume transmit beam 281 is in state A and receive beam 282 is in state B. That means the partner must transmit in state B and receive from state A. For A and B, you may substitute orthogonal polarizations (left circular/right circular, horizontal/vertical, for example), red and blue wavelength, odd or even seconds (time multiplexing), any other orthogonality approach. Conversely, when two terminals are constructed identically, they will both transmit A, which they will be unable to receive at their detector. Therefore, it is necessary for the terminal to be able to switch between the two types of systems.

This is referred to as the "handedness problem", as there must be two complementary types of terminals or terminal configurations. Only two are needed as all links are simple point-to-point, with two ends. If it is desirable for any terminal to talk to any other terminal, then at least one of them needs a capability to switch between handedness configurations.

In polarization, this is simply accomplished. The polarization to/from the terminal will be left- or right-circular polarization. Typically, circular polarization is used to avoid sensitivity to platform orientation. A quarter wave plate oriented with its fast axis 45 degrees between horizontal and vertical will switch vertical to right circular, and horizontal to left circular. The same waveplate can take vertically polarized TX light and make it right circular, and left circular from the other terminal entering the spacecraft and make it horizontal. With a few exceptions, none relevant here, the direction of light can be "time reversed" and behavior remains the same. To switch the conversion of vertical from right circular to left circular, simply rotate the fast axis of the quarter-wave plate from +45 degrees to −45 degrees. This can also be achieved without moving the quarter waveplate by moving a half waveplate into the path. A half-wave plate will exchange left and right circular polarizations regardless of the orientation of its fast axis. Finally, note that the quarter waveplate may be made from an electro-optic polymer allowing one to electronically control the fast axis direction without moving parts.

The techniques of wavelength-division multiplexing are well developed in the telecom industry. These techniques will allow one to switch between two sets of wavelengths to resolve the handedness problem. Gratings, etalons, even fiber switches can be employed to change states.

Time interleaving is perhaps the simplest to implement. At any one time, the link is half-duplex so there is no contention or interference between transmit and receive paths. The only requirement is that terminals must stay synchronized. Two approaches are to use an absolute time reference (e.g., GPS) or simply coordinate using the optical signal. There are subtleties to consider as the round-trip delay ranges from several milliseconds to tenths of a second for geosynchronous satellites. There are data latency penalties associated with time interleaving that depend on the turn-around interval and path propagation delay.

Using polarization-based orthogonality simplifies the common-path approach and precision tracking while allowing simultaneous transmit and receive. This also leaves open the addition of wavelength division multiplexing to increase data rate.

Receive Beam

1.5 Implementation Extensions

This section contains alternate implementation options and additional design features.

1.5.1 Wavelength Division Multiplexing

Data rates in optical communication systems can be increased through the use of larger apertures, higher power transmitters, more sensitive receivers or shorter path lengths. A practical limit on scalability arises from the performance of the electronics and electro-optics in the system. Modulators and detectors have finite bandwidth, and digital electronics have upper limits on clock rates, etc. For this reason, optical systems with very high data rates often utilize wavelength division multiplexing (WDM). In essence, multiple orthogonal channels are operated in parallel with each channel operating at a rate that is within the electronics' capabilities.

Transceiver optical assemblies disclosed herein may be adapted to handle WDM signaling. Some notable embodiments include:

- Multiple light beams 280 may be joined in the collimated beam space at the TX input to beam splitter 210 at port 211.
- Multiple photodetectors 204 may be fed after beam sampler 230. A smaller diameter collimated beam space with dichroic pick-offs could be used to partition the signals.
- A single tracking focal plane, e.g., tracking FPA 170, continues to be used as before without any modification.

1.5.2 Fiber-Coupled Receivers

Figure 8:
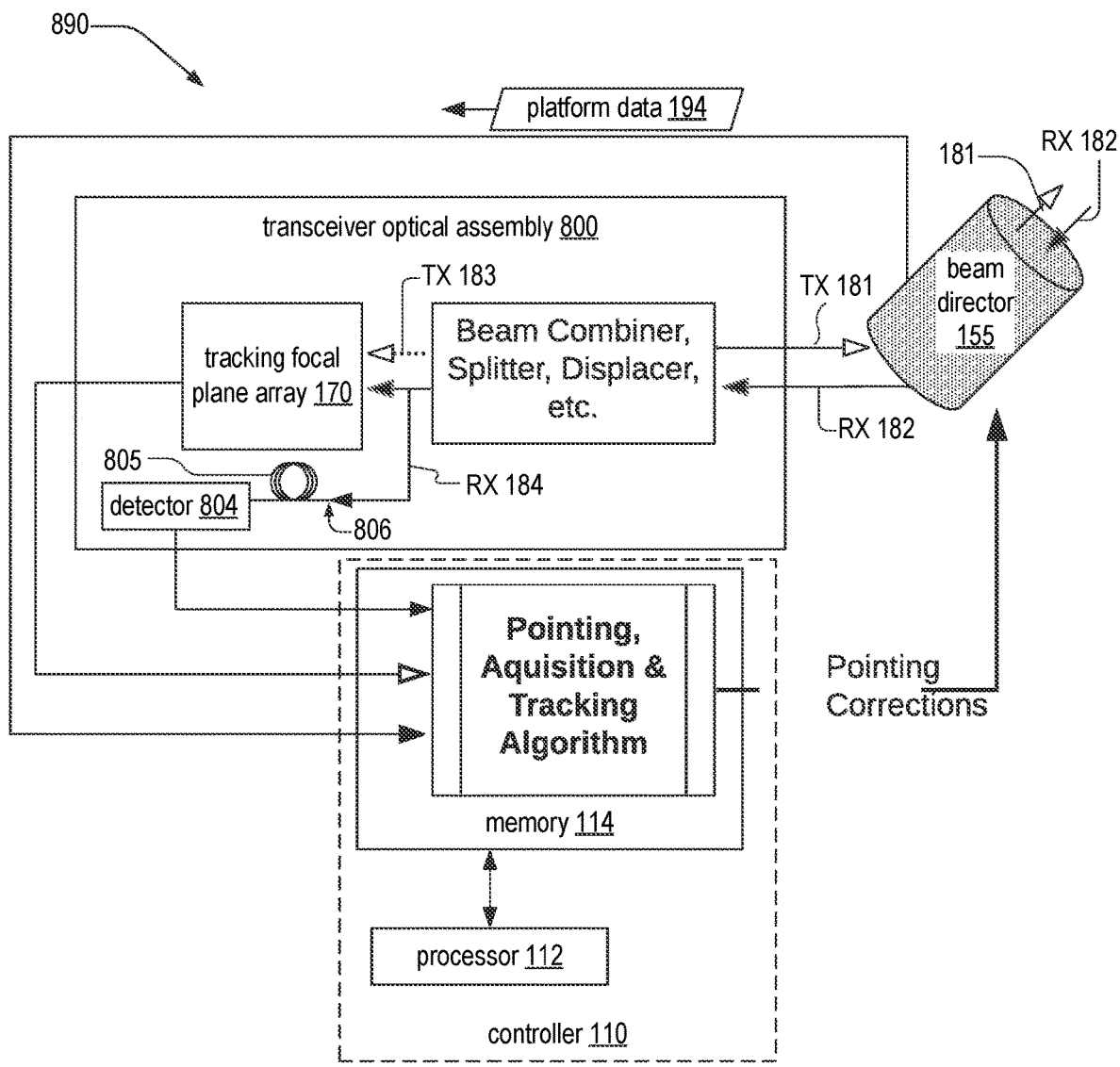
FIG. 8 is a schematic of the single-aperture optical transceiver of FIG. 1, with the addition of a fiber-coupled detector for augmenting pointing, acquisition, and tracking, in an embodiment.

In embodiments, photodetector 204 is a fiber-coupled receiver, as shown in FIG. 8. FIG. 8 is a schematic of a single-aperture optical transceiver 890, which includes an optical assembly 800. Transceiver 890 and optical assembly 800 are respective examples of transceiver 190 and optical assembly 100, FIG. 1. Optical assembly 800 includes a detector 804 and an optical fiber 805 coupled thereto for augmenting pointing, acquisition, and tracking. Detector 804 is an example of photodetector 204, FIG. 2. RX beam 184 is coupled from free-space to an end facet 806 of optical fiber 805.

A benefit of detector 804 being coupled to optical fiber 805 is that either or both detector 804 and 805 may be components developed for the fiber telecommunication industry. Optical fiber 805 may include an optical preamplifier (e.g., an erbium-doped fiber amplifier) and/or a filter for accomplishing WDM.

In embodiments, optical fiber 805 is a single mode fiber. For example, optical fiber 805 may be a single mode fiber at 1550 nm, and have a core diameter of roughly ten microns, which leads to a much narrower field of view than a photodiode (e.g., 2.1 GHz bandwidth APDs have a sensitive area ~230 microns in diameter).

1.5.2.1 Peak Power Tracking

In embodiments, a power peaking algorithm is used for tracking (co-aligning) receive beam 282T and optical fiber 805 (end facet 806) or photodetector 204. The coarse position of optical fiber 805 is well established by the common optical path design of optical assembly 200. This knowledge reduces the space over which transceiver 890 needs to search and the power received by the fiber detector can be used as a metric to assess tracking state.

In embodiments, the pointing, acquisition and tracking (PAT) algorithm is executed by controller 110 and uses the receive power of beam 184 as an input parameter, The PAT algorithm uses its priors to position RX beam 184 in the approximate location of optical fiber 805, then a raster (or similar) scan can be used in conjunction with the power measurement to identify the precise position. A perturb-and-observe approach may be used to maintain tracking.

1.5.2.2 Fiber Metrology Signal

Figure 9:
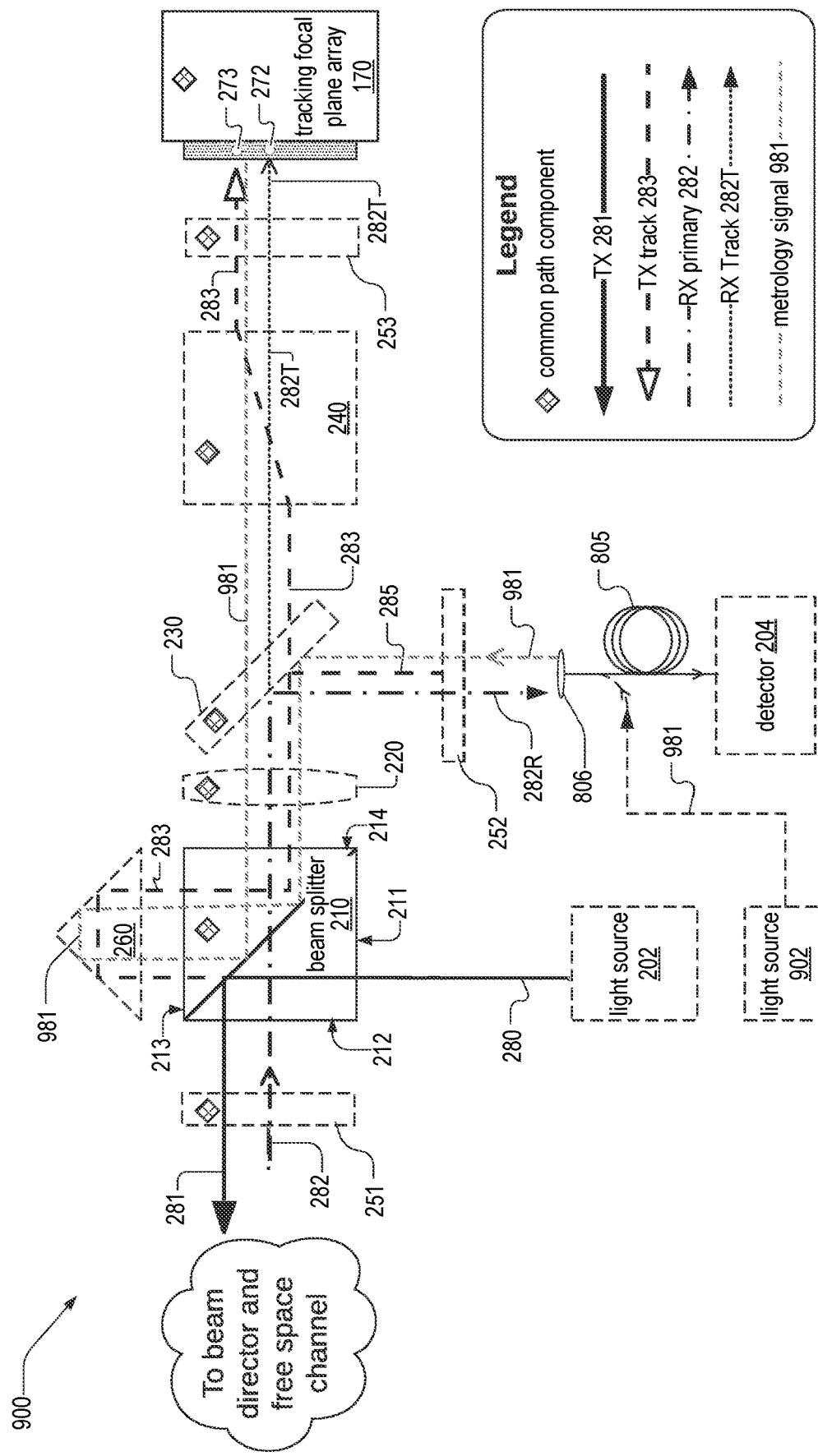
FIGS. 9 and 10 are schematics of respective transceivers, each of which is an example of the transceiver of FIG. 1 with the addition of an optical fiber for launching a metrology signal.

Another approach for tracking the position of optical fiber 805 (e.g., of end facet 806) is to add a counter-propagating signal to the fiber that can be detected by the tracking focal plane, as shown in FIG. 9. FIG. 9 is a schematic of a transceiver optical assembly 900, which is an embodiment of transceiver optical assembly 200 with the addition of optical fiber 805 for launching a metrology signal 981. FIG. 9 depicts end facet 806 as an ellipse to illustrate that optical fiber 805 both receives signal 282R and launches metrology signal 981 from end facet 806.

In embodiments, transceiver optical assembly 900 includes a light source 902 coupled to optical fiber 805 for generating metrology signal 981. Light source 902 may be light source 202, such that metrology signal 981 is part of light beam 280 redirected to optical fiber 805.

Metrology signal 981 propagates along common optical path to allow tracking FPA 170 to measure the position of reference beam 283, tracked receive-beam 282T and end facet 806 all in a common collimated beam space. In embodiments, metrology signal 981 differs from each of Reference beam 283 and tracked receive-beam 282T in some property such that it can be distinguished upon detection. Examples of this property include wavelength diversity and temporal amplitude variation.

Figure 10:
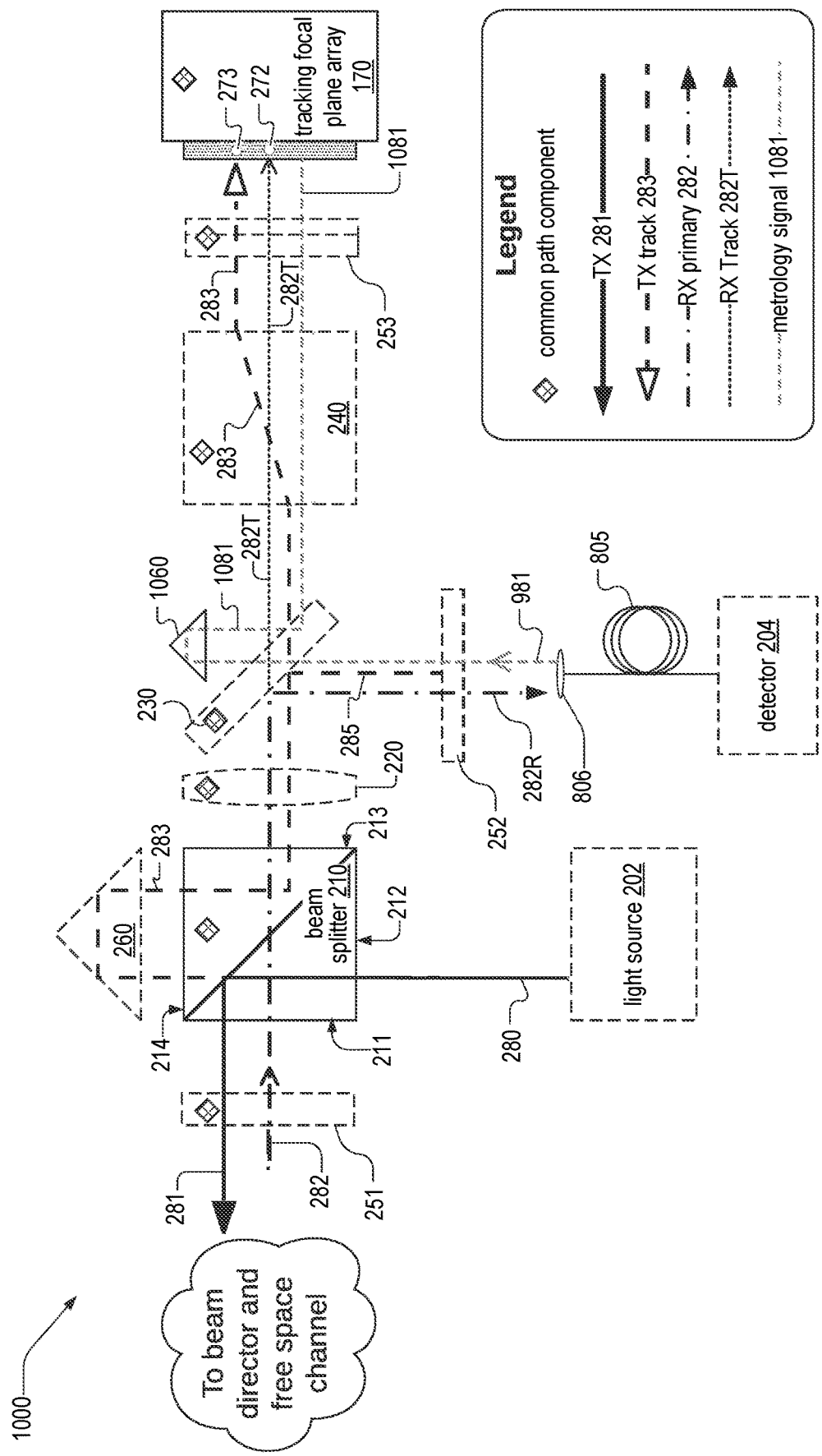

An alternate optical configuration for this approach is illustrated in FIG. 10. FIG. 10 is a schematic of a transceiver optical assembly 1000, which is an embodiment of transceiver optical assembly 200 with the addition of optical fiber 805 for launching metrology signal 981, and a retroreflector 1060 for directing metrology signal 981 to tracking FPA 170 as a metrology signal 1081. While transceiver optical assembly 900 has one fewer optical component than transceiver optical assembly 1000, a benefit of this additional component, retroreflector 1060, is less attenuation of metrology signal 981 as it propagates from optical fiber 805 to tracking FPA 170.

1.5.3 Photon-Counting Detectors

In embodiments, photodetector 204 is a photon counting detector. Some of these detectors are fiber-coupled, while others are directly coupled. Examples include superconducting nanowire arrays, Geiger mode APDs, silicon photomultipliers (SiPM), and conventional photomultiplier tubes. Some of these devices demand uniform illumination for optimal operation, and the coupling scheme may need to accommodate this requirement.

1.6 Additional Embodiments

Figure 11:
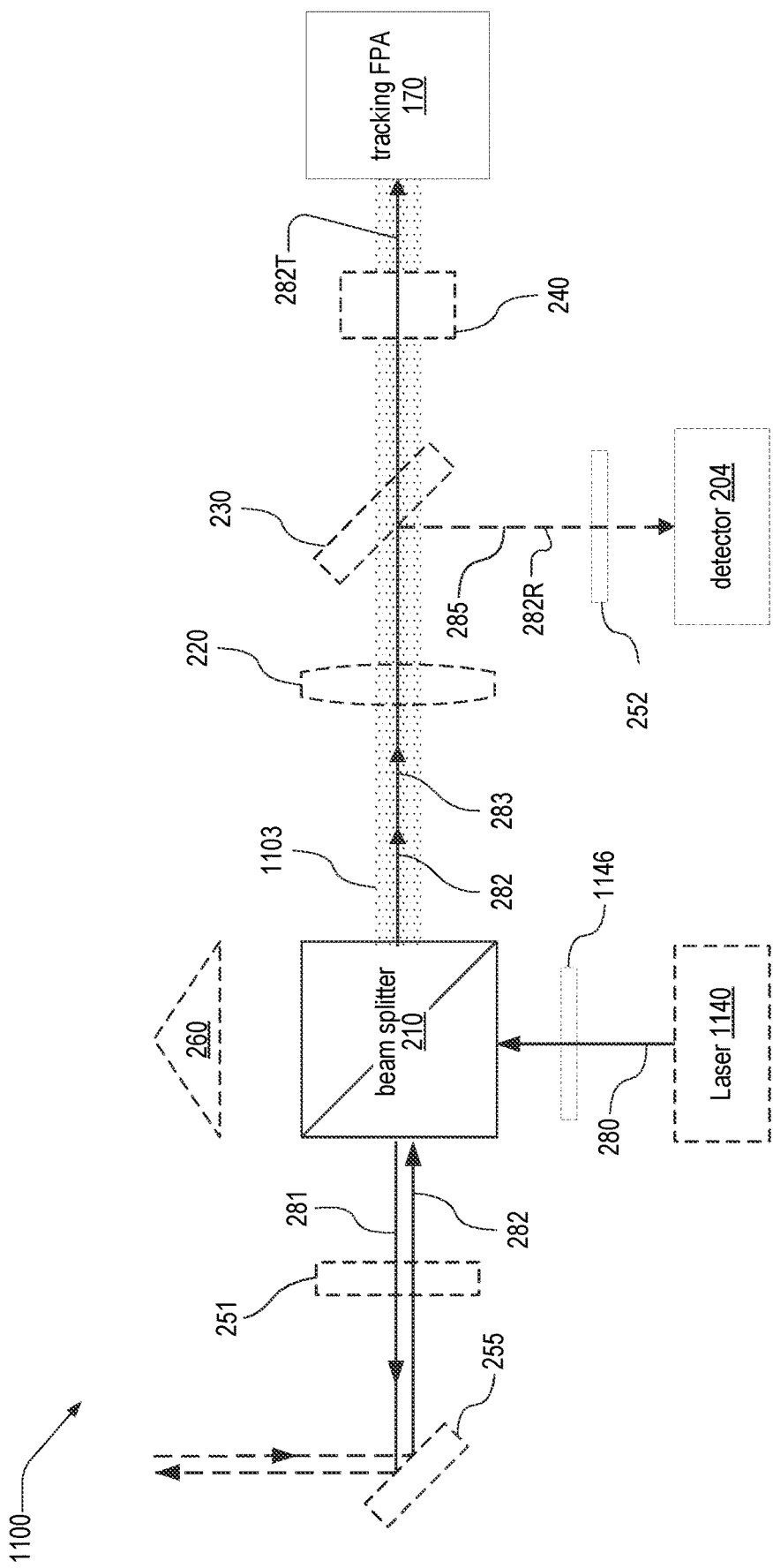
FIG. 11 illustrates one single-aperture optical transceiver, according to an embodiment.

FIG. 11 is a schematic of a transceiver optical assembly 1100 with a reference beam 283 and a common optical path 1103. Transceiver optical assembly 1100 is an example of transceiver optical assembly 200, and includes a beam splitter 210 and tracking FPA 170 at respective ends of a common optical path 1103. Light beam 280 is split by beam splitter 210 to form reference beam 283, which is directed onto common optical path 1103, and transmit beam 281. In embodiments, transceiver optical assembly 1100 includes at least one of filter 251 and beam director 255, in which case common optical path 1103 extends to intersect each of these elements. In embodiments, at least part of common optical path 1103 is within an optical fiber.

Transceiver optical assembly 1100 receives a receive beam 282 that travels along common optical path 1103. In an embodiment, light beam 1142 is generated by a laser 1140 that is included in transceiver optical assembly 1100. In embodiments, optical assembly 1100 includes retroreflector 260, which may be a corner-cube mirror that redirects reflected light while maintaining collinearity. As a result, reference beam 283 and transmit beam 281 are collinear. In an embodiment, retroreflector 260 is a flat mirror. In an embodiment, transceiver optical assembly 1100 includes a beam director 255 that directs one or both of transmit beam 281 and receive beam 282. Beam director 255 is positioned such that transmit beam 281 strikes beam director 255 after interaction with beam splitter 210. Beam director 255 is used to direct transmit beam 281 toward a target (not shown), which may be another single-aperture optical transceiver or another member of a communication network (not shown). In embodiments, beam director 255 is, or includes, a mirror.

In an embodiment, transceiver optical assembly 1100 includes a beam displacer 240 configured to separate reference beam 283 and receive beam 282 such that reference beam 283 and receive beam 282 are distinctly detected by tracking FPA 170. Beam displacer 240 may use a range of physical parameters to de-multiplex receive beam 282 and reference beam 283. Examples of physical parameters used by beam displacer 240 include linear polarization of light, circular polarization of light, orbital angular momentum of light, wavelength of light, or time interleaving.

In an embodiment, beam displacer 240 is formed of a birefringent material. In such embodiments, when reference beam 283 is linearly polarized in a first direction and receive beam 282 is linearly polarized in a second direction that is substantially perpendicular to the first direction, beam displacer 240 spatially separates reference beam 283 and receive beam 282 (such that both reference beam 283 and receive beam 282 are detected by tracking FPA 170 at different physical locations on a focal plane of tracking FPA 170).

Without departing from the scope hereof, beam displacer 240 may use other methods to separate receive beam 282 from reference beam 283, such as time or wavelength of light without departing from the scope herein.

In an embodiment, transceiver optical assembly 1100 of FIG. 11 includes a beam sampler 230 to direct a portion of receive beam 282 toward photodetector 204.

In an embodiment, optical assembly 200 includes a polarizing filter 1146 that attenuates components of light beam 1142 that are polarized in a direction other than the second direction. In an embodiment, transceiver optical assembly 1100 includes filter 252 to prevent noise beam 285 from reaching photodetector 204.

In an embodiment, transceiver optical assembly 1100 includes a lens 220 configured along common optical path 1103 that conditions reference beam 283 and receive beam 282. In an embodiment, lens 220 brings both reference beam 283 and receive beam 282 to a focus at a focal plane of tracking FPA 170. By bringing reference beam 283 and receive beam 282 to a focus, lens 220 allows for more sensitive detection of reference beam 283 and receive beam 282 by tracking FPA 170. Lens 220 affords information about the incoming angle of reference beam 283 and receive beam 282, as well.

Figure 12:
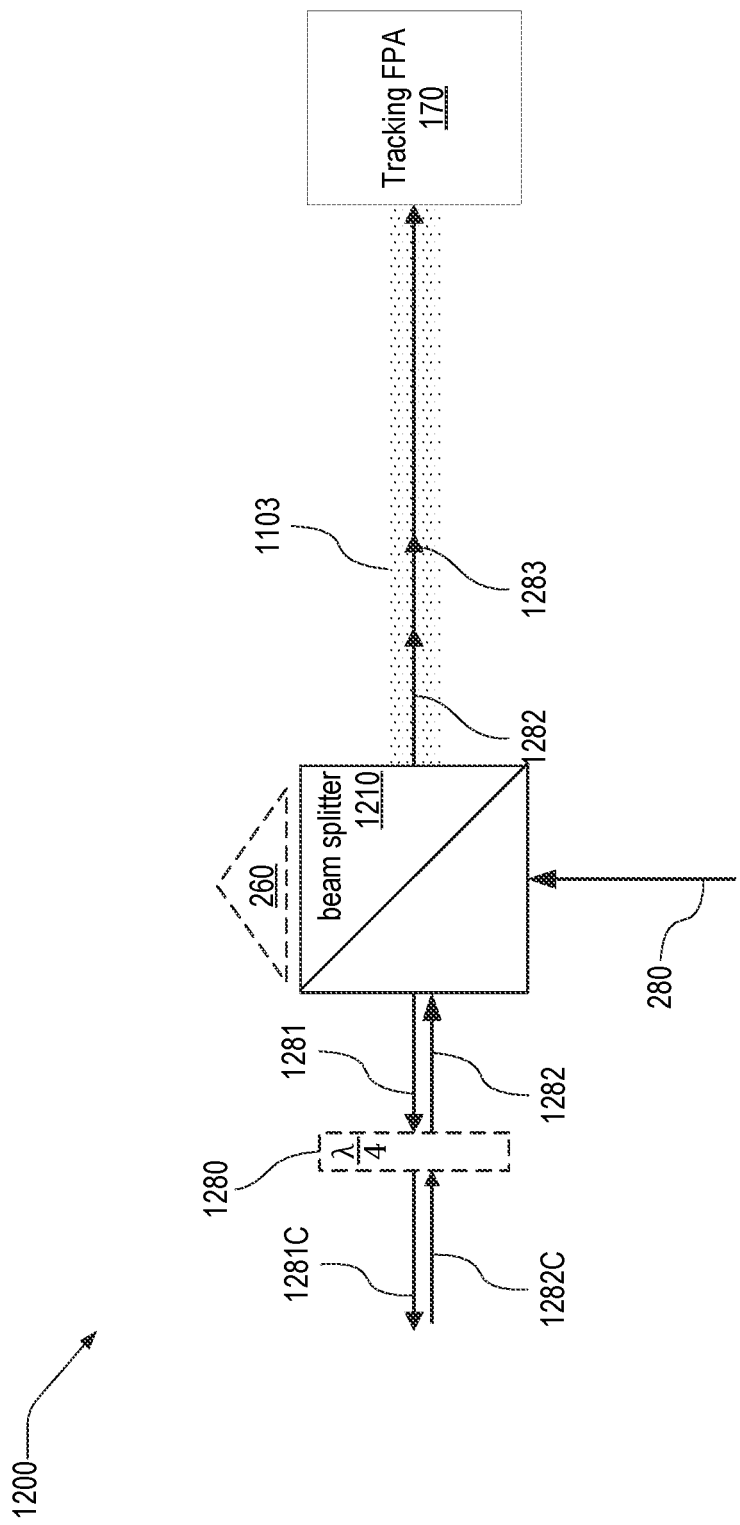
FIG. 12 illustrates a single-aperture optical transceiver of FIG. 1 with a quarter-wave plate, according to an embodiment.

FIG. 12 is a schematic of a transceiver optical assembly 1200, which is an example of transceiver optical assembly 200 that includes a quarter-wave plate 1280 and a polarizing beam splitter 1210, which is an example of beam splitter 210. In this embodiment, beam splitter 210 is a polarizing beam splitter that splits light beam 280 into transmit beam 1281 and a reference beam 1283 based on the linear polarization of the two. Beams 1281 and 1283 are respective examples of beams 281 and 283.

Quarter-wave plate 1280 converts (a) transmit beam 1281 to a circularly-polarized output beam 1281C and (b) a circularly-polarized input beam 1282C to a linearly polarized receive beam 1282, which is directed by polarizing beam splitter 1210 onto common optical path 1103 and subsequently to a tracking FPA 170. Receive beam 1282 is an example of receive beam 282.

In this configuration, when light beam 280 is physically overlapped with receive beam 1282 when incident on polarizing beam splitter 1210, receive beam 1282 and reference beam 1283 will remain spatially overlapped (both in position and angle) while traversing common optical path 1103. This overlapped condition is still satisfied when polarizing beam splitter 1210 becomes misaligned.

Figure 13:
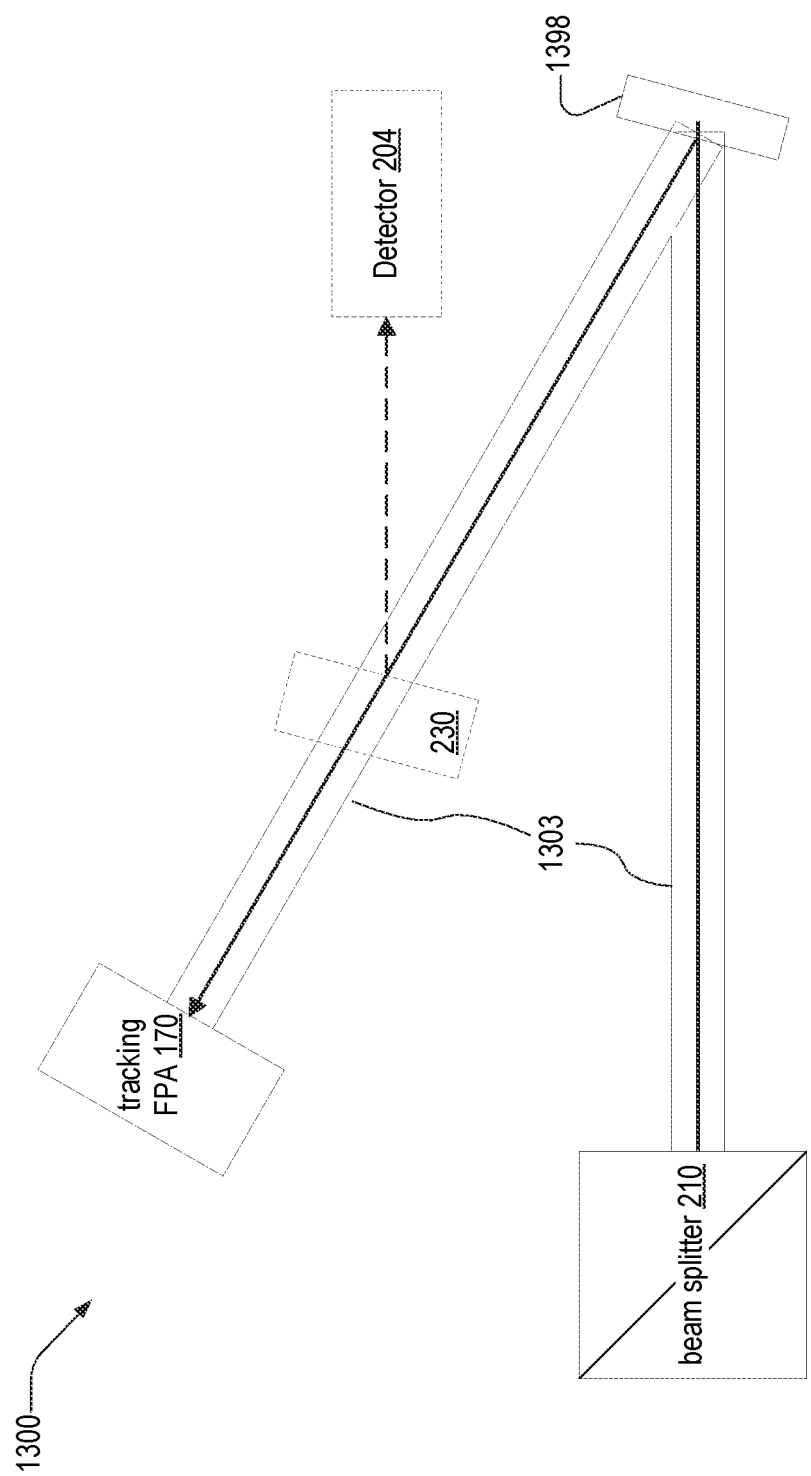
FIG. 13 illustrates a single-aperture optical transceiver of FIG. 11 that includes a re-directing mirror along a common optical path, according to an embodiment.

FIG. 13 is a schematic of a transceiver optical assembly 1300. Optical assembly is an example of optical assembly 200, and includes a re-directing mirror 1398 along a common optical path 1303, which is an example of common optical path 1103. Mirror 1398 allows for a more compact physical size of transceiver optical assembly 1300. Transceiver optical assembly 1300 includes beam splitter 210 and tracking FPA 170. In an embodiment, transceiver optical assembly 1300 includes beam sampler 230 and photodetector 204. The orientation angles of re-directing mirror 1398 and beam sampler 230 may be chosen to alter the aspect ratio of transceiver optical assembly 1300 to be more favorable for certain manufacturing processes. In an embodiment, more than one re-directing mirrors are used to alter overall size and shape of transceiver optical assembly 1300. It should be understood that the physical orientation of the single-aperture optical transceivers 1100, 1200, and 1300 may vary with respect to the planar angles or torsional angles. Rotations about any of the light axes do not depart from the scope herein.

Figure 14:
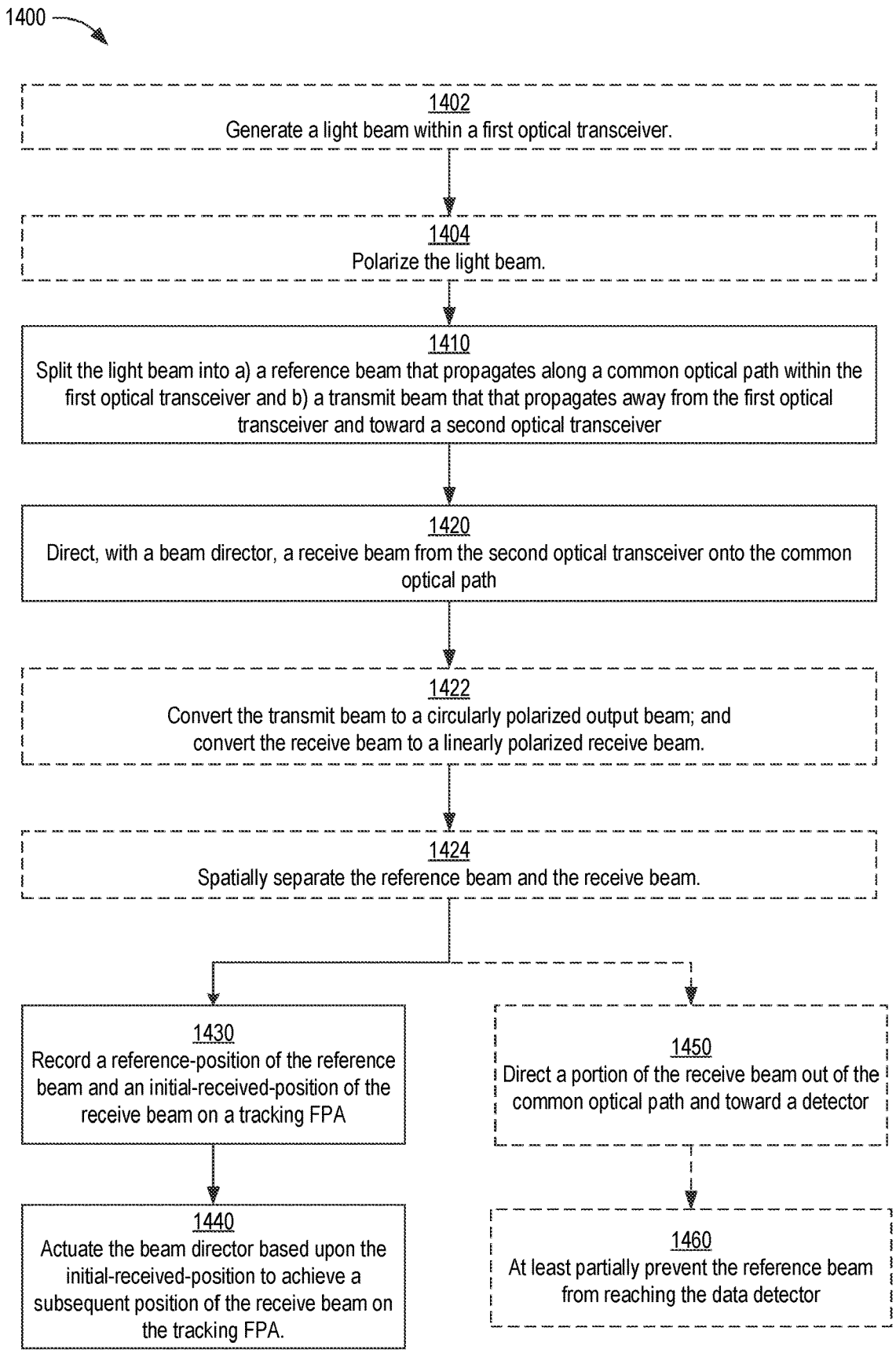
FIG. 14 is a flowchart that illustrates the method for aligning an optical transceiver, in an embodiment.

FIG. 14 is a flowchart illustrating a method 1400 for aligning an optical transceiver. Method 1400 may be implemented by part or all of any of transceiver optical assemblies 200, 800, 900, 1000, 1100, 1200, and 1300. Method 1400 includes steps 1410, 1420, 1430, and 1440.

Step 1410 including splitting a light beam into a) a reference beam that propagates along a common optical path within the first optical transceiver and b) a transmit beam that that propagates away from the first optical transceiver and toward a second optical transceiver. In example of step

1410, beam splitter 210 splits light beam 280 into reference beam 283 and transmit beam 281.

Step 1420 includes directing, with a beam director, a receive beam from the second optical transceiver onto the common optical path. In an example of step 1420, beam director 255 directs receive beam 282 onto common optical path 1103, FIG. 11.

Step 1430 includes recording, with a tracking FPA that intersects the common optical path, a reference-position of the reference beam and an initial-received-position of the receive beam on the tracking FPA. In an example of step 1430, tracking FPA 170 records a position of TX spot 273 and an initial position of RX spot 272.

Step 1440 includes actuating the beam director based upon the initial-received-position to achieve a subsequent position of the receive beam on the tracking FPA. In embodiments, the tracking FPA includes a sensor array having a sensor-array center, and a distance between the initial-received-position and the sensor-array center exceeding a distance between the subsequent position and the sensor-array center. In an example of step 1440, controller 110 actuates beam director 255 based on the initial position of RX spot 272 determined in step 1430.

In embodiments, the desired position may incorporate the position of the reference beam and thereby the desired position is, in effect, a desired relative position. In embodiments where the receive beam originates from a moving object, it may be necessary to include a so-called point-ahead correction to the desired position of the signals, which results from the relative velocity of the single-aperture optical transceiver and the moving object.

In embodiments, method 1400 also includes at least one of steps 1402, 1404, 1422, 1424, 1450, and 1460. In step 1402, the light beam is generated within the first optical transceiver by a laser. In an example of step 1402, light source 202 generates light beam 280.

Step 1422 includes converting the transmit beam to a circularly polarized output beam and converting the receive beam to a linearly polarized receive beam. In an example of step 1422, quarter-wave plate 1280 converts transmit beam 1281 to beam 1281C, and converts receive beam 1282C to receive beam 1282, as shown in FIG. 12.

Step 1424 includes spatially separating the reference beam and the receive beam according to an attribute value of the reference beam that differs from an attribute value of the receive beam. The attribute value is a value of an attribute, wherein the attribute is one of polarization, wavelength, temporal amplitude variation, and orbital angular momentum.

Step 1450 includes directing a portion of the receive beam out of the common optical path and toward a detector. In an example of step 1450, beam sampler 230 directs receive beam 282R to photodetector 204.

In embodiments, step 1450 includes directing a portion of the reference beam toward the photodetector. Such embodiments may include step 1460, which includes at least partially attenuating the portion of the reference beam. In an example of step 1460, filter 252 at least partially attenuates noise beam 285, hence preventing part or all of noise beam 285 from reaching detector 204.

2.0 Combinations of Features

Features described above as well as those claimed below may be combined in various ways without departing from the scope hereof. The following enumerated examples illustrate some possible, non-limiting combinations.

(A1) A method for aligning a first optical transceiver includes steps of splitting, directing, recording, and actuating. The splitting step includes splitting a light beam into a) a reference beam that propagates along a common optical path within the first optical transceiver and b) a transmit beam that that propagates away from the first optical transceiver and toward a second optical transceiver. The directing step includes directing, with a beam director, a receive beam from the second optical transceiver onto the common optical path. The recording step includes recording, with a tracking focal-plane array (FPA) that intersects the common optical path, a reference-position of the reference beam and an initial-received-position of the receive beam on the tracking FPA. The actuating step includes actuating the beam director based upon the initial-received-position to achieve a subsequent position of the receive beam on the tracking FPA.

(A2) Embodiments of method (A1) further include generating the light beam with a light source of the first optical transceiver.

(A3) in embodiments of either one of methods (A1) and (A2), the step of splitting further includes polarizing the light beam such that the reference beam and the transmit beam have respective orthogonal linear polarizations.

(A4) Embodiments of any one of methods (A1)-(A3) further include, when the receive beam being circularly polarized, converting the transmit beam to a circularly polarized output beam; and converting the receive beam to a linearly polarized receive beam.

(A5) Embodiments of any one of methods (A1)-(A4) further include before said step of recording, spatially separating the reference beam and the receive beam according to an attribute value of the reference beam that differs from an attribute value of the receive beam. The attribute value is a value of an attribute that is one of polarization, wavelength, temporal amplitude variation, and orbital angular momentum.

(A6) Embodiments of any one of methods (A1)-(A5) further include before said splitting the light beam, polarizing the light beam.

(A7) Embodiments of any one of methods (A1)-(A6) further include directing a portion of the receive beam out of the common optical path and toward a photodetector.

(A8) Embodiments of method (A7) further include, when directing a portion of the receive beam includes directing a portion of the reference beam toward the photoreactor, at least partially attenuating the portion of the reference beam.

(A9) In embodiments of any one of methods (A1)-(A8), the tracking FPA includes a sensor array having a sensor-array center. In the step of actuating, a distance between the initial-received-position and the sensor-array center exceeding a distance between the subsequent position and the sensor-array center.

(B1) A single-aperture optical transceiver includes a tracking focal-plane array (FPA), a beam splitter, and a retroreflector. The beam splitter that includes a first port, a second port, a third port opposite the first port, a fourth port opposite the second port, and a beam-splitting interface. The beam splitter and the tracking FPA define a common optical path for a receive beam and a reference beam that are respectively received and generated by the single-aperture optical transceiver. The retroreflector that retroreflects the reference beam exiting the third port back to the third port. The beam splitter splits a light beam incident on the first port into a transmit beam and the reference beam. The tracking FPA receives both the reference beam and the receive beam via the common optical path.

(B2) Embodiments of transceiver (B1) further include a light source that generates the light beam.

(B3) Embodiments of either one of transceivers (B1) and (B2) further include an actuatable beam director that intersects the common optical path, the beam splitter being between the actuatable beam director and the tracking FPA along the common optical path.

(B4) Embodiments of any one of transceivers (B1)-(B3) further include, on the common optical path between the beam splitter and the tracking FPA: a beam displacer that separates the reference beam and the receive beam such that the reference beam and the receive beam are detected by the tracking FPA distinctly.

(B5) In embodiments of transceiver (B4), the beam displacer is formed of a birefringent material, the reference beam is linearly polarized in a first plane and the receive is being linearly polarized in a second plane that is substantially orthogonal to the first plane.

(B6) Embodiments of transceiver (B5), further include a polarizing filter to attenuate components of the light beam that are linearly polarized in a plane other than the second plane.

(B7) Embodiments of any one of transceivers (B1)-(B7) further include a quarter-wave plate. The beam splitter is located between the tracking FPA and the quarter-wave plate along the common optical path such that the beam splitter directs the transmit beam to propagate through the quarter-wave plate.

(B8) in embodiments of transceiver (B7), the quarter-wave plate is configured to convert (a) the transmit beam to a circularly polarized output beam and (b) a circularly polarized input signal to the receive beam.

(B9) Embodiments of any one of transceivers (B1)-(B8) further include a beam sampler on the common optical path between the beam splitter and the tracking FPA to direct a portion of the receive beam toward a detector.

(B10) Embodiments of transceiver (B9) further include the detector and an optical fiber. The optical fiber is coupled to (i) the detector and (b) a light source that generates a metrology signal. The optical fiber is positioned to both (i) receive the portion of the receive beam and (ii) launch the metrology signal toward the beam sampler.

(B11) Embodiments of transceiver (B10) further include a lens on the common optical path between the tracking FPA and the beam splitter. A distance between the lens and the tracking FPA differing from a focal length of the lens by less than a depth of focus of the lens.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for aligning a first optical transceiver, comprising:
    splitting a light beam into a) a reference beam that propagates along a common optical path within the first optical transceiver and b) a transmit beam that propagates away from the first optical transceiver and toward a second optical transceiver;
    directing, with a beam director, a receive beam from the second optical transceiver onto the common optical path;
    recording, with a tracking focal-plane array (FPA) that intersects the common optical path, a reference-position of the reference beam and an initial-received-position of the receive beam on the tracking FPA; and
    actuating the beam director based upon the initial-received-position to achieve a subsequent position of the receive beam on the tracking FPA.

2. The method of claim 1, further comprising generating the light beam with a light source of the first optical transceiver.

3. The method of claim 1, the step of splitting further comprising polarizing the light beam such that the reference beam and the transmit beam have respective orthogonal linear polarizations.

4. The method of claim 1, the receive beam being circularly polarized, and further comprising:
    converting the transmit beam to a circularly polarized output beam; and
    converting the receive beam to a linearly polarized receive beam.

5. The method of claim 1, further comprising, before said step of recording, spatially separating the reference beam and the receive beam according to an attribute value of the reference beam that differs from an attribute value of the receive beam, the attribute value being a value of an attribute that is one of polarization, wavelength, temporal amplitude variation, and orbital angular momentum.

6. The method of claim 1, further comprising, before said splitting the light beam, polarizing the light beam.

7. The method of claim 1, further comprising directing a portion of the receive beam out of the common optical path and toward a photodetector.

8. The method of claim 7, directing a portion of the receive beam including directing a portion of the reference beam toward the photodetector, and further comprising at least partially attenuating the portion of the reference beam.

9. The method of claim 1, the tracking FPA including a sensor array having a sensor-array center, in the step of actuating, a distance between the initial-received-position and the sensor-array center exceeding a distance between the subsequent position and the sensor-array center.

10. A single-aperture optical transceiver, comprising:
    a tracking focal-plane array (FPA);
    a beam splitter that includes a first port, a second port, a third port opposite the first port, a fourth port opposite the second port, and a beam-splitting interface, the beam splitter and the tracking FPA defining a common optical path for a receive beam and a reference beam that are respectively received and generated by the single-aperture optical transceiver; and
    a retroreflector that retroreflects the reference beam exiting the third port back to the third port;
    the beam splitter splits a light beam incident on the first port into a transmit beam and the reference beam;
    the tracking FPA receiving both the reference beam and the receive beam via the common optical path.

11. The transceiver of claim 10, further comprising a light source that generates the light beam.

12. The transceiver of claim 10, further comprising an actuatable beam director that intersects the common optical path, the beam splitter being between the actuatable beam director and the tracking FPA along the common optical path.

13. The transceiver of claim 10, further comprising, on the common optical path between the beam splitter and the tracking FPA:

a beam displacer that separates the reference beam and the receive beam such that the reference beam and the receive beam are detected by the tracking FPA distinctly.

14. The transceiver of claim 13, the beam displacer being formed of a birefringent material, the reference beam being linearly polarized in a first plane and the receive beam being linearly polarized in a second plane that is substantially orthogonal to the first plane.

15. The transceiver of claim 14, further comprising a polarizing filter to attenuate components of the light beam that are linearly polarized in a plane other than the second plane.

16. The transceiver of claim 10, further comprising a quarter-wave plate, the beam splitter being located between the tracking FPA and the quarter-wave plate along the common optical path such that the beam splitter directs the transmit beam to propagate through the quarter-wave plate.

17. The transceiver of claim 16, the quarter-wave plate being configured to convert (a) the transmit beam to a circularly polarized output beam and (b) a circularly polarized input signal to the receive beam.

18. The transceiver of claim 10, further comprising a beam sampler on the common optical path between the beam splitter and the tracking FPA to direct a portion of the receive beam toward a detector.

19. The transceiver of claim 18, further comprising:
the detector; and
an optical fiber coupled to (i) the detector and (b) a light source that generates a metrology signal, the optical fiber being positioned to both (i) receive the portion of the receive beam and (ii) launch the metrology signal toward the beam sampler.

20. The transceiver of claim 18, further comprising a lens on the common optical path between the tracking FPA and the beam splitter, a distance between the lens and the tracking FPA differing from a focal length of the lens by less than a depth of focus of the lens.

\* \* \* \* \*